United States Patent [19]

Oyamada et al.

[11] Patent Number: 5,110,856
[45] Date of Patent: May 5, 1992

[54] VINYL ACETATE-ETHYLENE COPOLYMER EMULSION AND PROCESS FOR PRODUCING THE SAME

[75] Inventors: Takeo Oyamada; Yoshito Taira; Masayoshi Nitta; Yasuo Kaneshima; Tateshi Kurino; Shizuo Narisawa, all of Chiba, Japan

[73] Assignee: Sumitomo Chemical Co., Ltd., Osaka, Japan

[21] Appl. No.: 761,137

[22] Filed: Sep. 17, 1991

Related U.S. Application Data

[62] Division of Ser. No. 486,453, Feb. 28, 1990, Pat. No. 5,070,134.

[30] Foreign Application Priority Data

Feb. 28, 1989 [JP] Japan .................. 1-49565
Dec. 13, 1989 [JP] Japan ................. 1-324797

[51] Int. Cl.⁵ .................................. C08F 2/16
[52] U.S. Cl. ........................... 524/459; 524/503
[58] Field of Search ..................... 524/459, 503

[56] References Cited

U.S. PATENT DOCUMENTS

| | | | |
|---|---|---|---|
| 4,128,518 | 12/1978 | Oyamada et al. | 428/523 X |
| 4,267,090 | 5/1981 | Heimberg et al. | 524/459 |
| 4,735,986 | 4/1988 | Iacoviello | 524/427 |
| 4,921,898 | 5/1990 | Lenney et al. | 524/459 |

FOREIGN PATENT DOCUMENTS

| | | |
|---|---|---|
| 0153728 | 9/1985 | European Pat. Off. . |
| 0279384 | 8/1988 | European Pat. Off. . |
| 17-22692 | 11/1942 | Japan . |
| 4317583 | 10/1964 | Japan . |
| 0120680 | 7/1983 | Japan .................. 524/459 |
| 60-1272 | 1/1985 | Japan . |
| 63-223053 | 8/1988 | Japan . |

Primary Examiner—Joseph L. Schofer
Assistant Examiner—J. M. Reddick
Attorney, Agent, or Firm—Sughrue, Mion, Zionn Macpeak & Seas

[57] ABSTRACT

A vinyl acetate-ethylene copolymer emulsion is disclosed, comprising a vinyl acetate-ethylene copolymer composed of from 10 to 40% by weight of an ethylene unit and from 90 to 60% by weight of a vinyl acetate unit and an emulsifying dispersant in an amount of from 2.5 parts by weight or more but less than 5.0 parts by weight per 100 parts by weight of the vinyl acetate unit, and having a mean particle size of not larger than 0.9 μm and a solids content of from 65 to 75% by weight, wherein the emulsifying dispersant contains from 1.0 to 1.9 parts by weight of partially saponified polyvinyl alcohol prepared so as to have an average polymerization degree of from 300 to 1,000 and from 1.0 to 3.0 parts by weight of a polyoxyethylene nonionic surface active agent having an HLB of from 16.5 to 17.5 per 100 parts by weight of the vinyl acetate unit. A process for producing the vinyl acetate-ethylene copolymer is also disclosed.

3 Claims, No Drawings

VINYL ACETATE-ETHYLENE COPOLYMER EMULSION AND PROCESS FOR PRODUCING THE SAME

This is a division of application Ser. No. 07/486,453 filed Feb. 28, 1990 now U.S. Pat. No. 5,070,134.

FIELD OF THE INVENTION

This invention relates to a vinyl acetate-ethylene copolymer emulsion and a process for producing the same. More particularly, the invention relates to a vinyl acetate-ethylene copolymer emulsion capable of providing an adhesive having excellent initial adhesion properties, resistance to thermal creep, low-temperature adhesion properties, dry strength and wet strength, resistance to water retention, resistance to water blushing and adhering to a wide range of objects. The copolymer emulsion may be efficiently produced industrially since few scums are formed in the production steps and the emulsion has a proper viscosity. The invention also relates to a process for producing the aforementioned vinyl acetate-ethylene copolymer emulsion.

BACKGROUND OF THE INVENTION

Various desirable properties have been required for adhesives recently, with the increase of the kind of objects to be adhered and the availability of high-speed adhering machines, adhesives which are suitable for the joining of a wide range of materials, quickly showing the adhesion power after adhesion, and which are excellent in the so-called initial adhesion properties have been desired.

As an adhesive meeting such requirements, a vinyl acetate-ethylene copolymer emulsion having a high solids content is known.

For example, a vinyl acetate-ethylene copolymer emulsion having a solids content of from 45 to 60% by weight is described in JP-B-52-34650 (the term "JP-B" as used herein means an "examined Japanese patent publication"). Also, JP-B-42-22692 describes a process of producing a vinyl acetate-ethylene copolymer emulsion having a solids content of up to 70% by weight by using a polyoxyethylene-polyoxypropylene block copolymer as a surface active agent. Furthermore, JP-B-43-17538 describes a process of obtaining a vinyl acetate-ethylene copolymer emulsion having a solids content of from 60 to 70% by weight by using a surface active agent having an HLB (hydrophilic-lipophilic balance) of from 3 to 8 as an emulsifying dispersant before the polymerization reaction and adding a surface active agent having an HLB of at least 8 during the polymerization.

Furthermore, JP-A-60-1272 describes polyvinyl acetate or vinyl acetate-ethylene copolymer emulsion having a solids content of from 55 to 70% by weight using specific polyvinyl alcohol of a low polymerization degree having an average polymerization degree of from 20 to 300 and having modified polymer terminals as an emulsifying dispersant. (The term "JP-A" as used herein means an "unexamined published Japanese patent application"). Moreover, JP-A-63-223053 describes a vinyl acetate-ethylene copolymer emulsion having a solids content of from 65 to 70% by weight and a viscosity of not higher than 3,500 cps at a solids content of 65% by weight by using polyvinyl alcohol and a surface active agent in amounts of from 2 to 4% by weight and from 1 to 4% by weight, respectively to a vinyl acetate monomer as emulsifying dispersants.

On the other hand, with the increase of the wide use of hydrophobic materials such as plastics, water-repellent papers, resin-coated papers, etc., as materials to be adhered using adhesives; and, with the development of increased high-speed adhering machines, the need for increasing the speed at which adhesives show adhesion power, that is, the requirement for the initial adhesion properties of adhesives, has been further enhanced. Furthermore, adhesives have recently been required for adhering various kinds of materials, including the aforementioned hydrophobic materials, and to give a high adhesion strength under various conditions. Also, it is, as a matter of course, necessary that such adhesives can be produced in an industrial production step without being accompanied by any inconvenience.

Adhesives meeting the aforesaid requirements have not yet been developed, including the aforesaid conventional techniques.

SUMMARY OF THE INVENTION

An object of this invention is to provide a vinyl acetate-ethylene copolymer emulsion capable of sufficiently meeting the aforesaid requirements as an adhesive.

A further object of this invention is to provide a vinyl acetate-ethylene copolymer emulsion giving a dry film without being accompanied by a blushing phenomenon when the film is brought into contact with water. It is one of the important factors for adhesives to avoid the occurrence of such a blushing phenomenon. The technique described in the above-cited JP-A-63-223053 is, however, insufficient in this point.

Another object of this invention is to provide a process for producing the aforesaid vinyl acetate-ethylene copolymer emulsion.

As the result of various investigations on obtaining a vinyl acetate-ethylene copolymer emulsion capable of providing an adhesive which exhibits excellent of initial adhesion properties, resistance to thermal creep, low-temperature adhesion properties, dry strength and wet strength, resistance to water retention, resistance to water blushing and can be used for a wide range of materials to be adhered. The copolymer emulsion may be easily industrially produced since the copolymer emulsion forms fewer scums and has a proper viscosity in the production step thereof. Also, on a process for producing the aforesaid vinyl acetate-ethylene copolymer emulsion, the inventors have succeeded in attaining the present invention.

That is, according to one embodiment of this invention, there is provided a vinyl acetate-ethylene copolymer emulsion comprising a vinyl acetate-ethylene copolymer composed of from 10 to 40% by weight of an ethylene unit and from 90 to 60% by weight of a vinyl acetate unit and an emulsifying dispersant in an amount of from 2.5 parts by weight or more but less than 5.0 parts by weight per 100 parts by weight of the vinyl acetate unit, and having a mean particle size of not larger than 0.9 $\mu$m and a solids content of from 65 to 75% by weight, wherein the emulsifying dispersant contains from 1.0 to 1.9 parts by weight of partially saponified polyvinyl alcohol prepared so as to have an average polymerization degree of from 300 to 1,000 and from 1.0 to 3.0 parts by weight of a polyoxyethylene nonionic surface active agent having an HLB of from 16.5 to 17.5 per 100 parts by weight of the vinyl acetate unit.

According to another embodiment of this invention, there is provided a process for producing the aforesaid vinyl acetate-ethylene copolymer emulsion, comprising a first step of mixing with stirring from 1.0 to 1.9 parts by weight of partially saponified polyvinyl alcohol prepared so as to have an average polymerization degree of from 300 to 1,000 and from 1.0 to 3.0 parts by weight of a polyoxyethylene nonionic surface active agent having an HLB of from 16.5 to 17.5 per 100 parts by weight of the whole of vinyl acetate to be polymerized together with a reducing agent of a redox catalyst, water, and, if desired, a pH buffer to provide an aqueous solution containing 2.5 parts by weight or more but less than 5.0 parts by weight of the emulsifying dispersant per 100 parts by weight of the vinyl acetate; a second step of adding from 40 to 90% by weight of vinyl acetate to be polymerized to the aqueous solution of the emulsifying dispersant under stirring to provide a stable vinyl acetate emulsified dispersion; and a third step of carrying out a polymerization reaction at a polymerization temperature of from 30° to 80° C. and an ethylene pressure of from 10 to 100 kg/cm$^2$ by using the vinyl acetate emulsified dispersion, while successively adding from 10 to 60% of vinyl acetate which is the residue of vinyl acetate to be polymerized to the polymerization system during the polymerization and further adding thereto at least 0.004 mole of an oxidizing agent of a redox catalyst per kilogram of the whole of vinyl acetate supplied within 3 hours after the initiation of the polymerization.

DETAILED DESCRIPTION OF THE INVENTION

The vinyl acetate-ethylene copolymer emulsion of this invention contains a vinyl acetate-ethylene copolymer and an emulsifying dispersant as main components.

The vinyl acetate-ethylene copolymer is composed of from 10 to 40% by weight of an ethylene unit and from 90 to 60% by weight of a vinyl acetate unit.

The emulsifying dispersant is contained in the vinyl acetate-ethylene copolymer emulsion of this invention in the range of 2.5 parts by weight or more but less than 5.0 parts by weight per 100 parts by weight of the vinyl acetate unit constituting the vinyl acetate-ethylene copolymer. Also, the emulsifying dispersant contains partially saponified polyvinyl alcohol and a polyoxyethylene nonionic surface active agent as main components.

The partially saponified polyvinyl alcohol for use in this invention as one main component of the emulsifying dispersant is partially saponified polyvinyl alcohol prepared so as to have an average polymerization degree of from 300 to 1,000, and preferably from 400 to 800. The partially saponified polyvinyl alcohol having such a polymerization degree may ultimately have an average polymerization degree in the aforesaid range in the whole and may contain partially saponified polyvinyl alcohols having a polymerization degree of less than 300 and/or more than 1,000 as the components. It is one of the excellent features of this invention that partially saponified polyvinyl alcohol having a polymerization degree over a wide range can be used as a component.

If the average polymerization degree of partially saponified polyvinyl alcohol after the preparation is less than 300, many scums form in the emulsion, the emulsion is unstable, causing phase separation, etc., and the viscosity of the emulsion is greatly reduced, making the workability at the application of the adhesive inferior. On the other hand, if the average polymerization degree after the preparation is over 1,000, the viscosity of the emulsion is greatly increased which causes problems in industrial practice: the power required for stirring at the preparation of the emulsion is increased and, further, it becomes difficult to uniformly stir the emulsion.

The term "partial saponification" in the partially saponified polyvinyl alcohol in this invention means that the saponification degree is less than 96%. If the saponification degree is 96% or higher, the emulsion is accompanied by phase separation or precipitation to reduce the stability thereof. A preferred saponification degree is from 70 to 96%.

The content of such partially saponified polyvinyl alcohol in the vinyl acetate-ethylene copolymer emulsion is from 1.0 to 1.9 parts by weight, and preferably from 1.2 to 1.8 parts by weight per 100 parts by weight of the vinyl acetate unit. If the content of partially saponified polyvinyl alcohol is less than 1.0 part by weight, the emulsion is inferior in stability as well as the formation of scums from the emulsion is increased. On the other hand, if the content is over 1.9 parts by weight, the film formed from the emulsion is inferior in resistance to water blushing, wet strength, and resistance to water retention.

One of the features of this invention is the finding that, only when the content of partially saponified polyvinyl alcohol is in the specific range as described above, does the copolymer emulsion show an excellent effect in resistance to water blushing. In particular, the effect on improving the resistance to water blushing of the film of the emulsion is remarkable when the content of partially saponified polyvinyl alcohol is less than the aforesaid upper limit of the above range, and this effect is one of the excellent features of this invention.

The polyoxyethylene nonionic surface agent used in this invention has an HLB of from 16.5 to 17.5. If the HLB of the surface active agent is less than 16.5, the particle size of the emulsion becomes too large (the mean particle size thereof becomes larger than 0.90 μm), which results in reducing the initial adhesion properties of the emulsion. On the other hand, if the HLB is over 17.5, the emulsion particles formed during the polymerization reaction rupture, which makes the reaction system unstable, and which results in forming an undesirably large amount of scums in the emulsion. The HLB as referred to herein is an index generally used for indicating the balance between hydrophilic groups and lipophilic groups in a surface active agent.

The content of such a polyoxyethylene nonionic surface active agent in the vinyl acetate-ethylene copolymer emulsion of this invention is from 1.0 to 3.0 parts by weight, and preferably from 1.5 to 2.8 parts by weight per 100 parts by weight of the vinyl acetate unit. If the content of the nonionic surface active agent is less than 1.0 part by weight, the emulsion is mainly inferior in low-temperature adhesion properties. On the other hand, if the content is over 3.0 parts by weight, the emulsion is inferior in resistance to thermal creep and resistance to water blushing; in addition as well the reaction system at the polymerization becomes unstable and a large amount of scum is undesirably formed in the emulsion.

Specific examples of the polyoxyethylene nonionic surface active agent for use in this invention are polyoxyethylene alkyl ethers, polyoxyethylene alkylallyl ethers, polyoxyethylene fatty acid esters, and polyoxyethylene sorbitan fatty acid esters.

In the case of using the polyoxyethylene nonionic surface active agent having an HLB of from 16.5 to 17.5 in an amount defined in this invention, other polyoxyethylene nonionic surface active agents having an HLB falling outside the range defined in this invention may be used together in an amount of not more than 3.0 parts by weight per 100 parts by weight of the vinyl acetate unit and of not more than 35 parts by weight per 100 parts by weight of the polyoxyethylene nonionic surface active agent having an HLB of from 16.5 to 17.5.

The vinyl acetate-ethylene copolymer emulsion of this invention has an average particle size of not larger than 0.9 $\mu$m and a solids content of from 65 to 70% by weight. Since the copolymer emulsion of this invention has a high solids content, the emulsion shows excellent initial adhesion properties, which is one of the objects of this invention.

Next, the process for producing the vinyl acetate-ethylene copolymer emulsion according to another embodiment of this invention is explained.

The process of this invention essentially comprises the following three steps.

A first step is a step of obtaining an aqueous solution containing 2.5 parts by weight or more but less than 5.0 parts by weight of an emulsifying dispersant per 100 parts by weight of the whole of vinyl acetate to be polymerized by mixing with stirring from 1.0 to 1.9 parts by weight of partially saponified polyvinyl alcohol having an average polymerization degree of from 300 to 1,000 and from 1.0 to 3.0 parts by weight of a polyoxyethylene nonionic surface active agent having an HLB of from 16.5 to 17.5 per 100 parts by weight of the vinyl acetate together with a reducing agent of a redox catalyst, water, and, if desired, a pH buffer.

As the reducing agent of redox catalyst, which is used in the first step, reducing agents which are usually used for the production of vinyl acetate-ethylene copolymer emulsions can be used, and specific examples thereof are sodium (or zinc) formaldehyde sulfoxylate, sodium glyoxal hydrogensulfite, and ferrous salts.

In this regard, a whole amount of the reducing agent used may be added in the step. Further, a part of the reducing agent is added in the step, and the residue may be added to the polymerization system in a third step described below.

A second step is a step of obtaining a stable vinyl acetate emulsified dispersion by adding from 40 to 90% by weight of vinyl acetate to be polymerized to the aqueous solution of the emulsifying dispersant obtained in the first step under stirring.

The stable vinyl acetate emulsified dispersion as referred to herein is an emulsified dispersion having such stability that, when the dispersion is allowed to stand for from about 10 hours to 20 hours, vinyl acetate is not separated in the dispersion. Such a stable vinyl acetate emulsified dispersion is obtained by the second step as described above. On the other hand, when water, an emulsifying dispersant, and vinyl acetate are simultaneously added and mixed, vinyl acetate is added to an aqueous solution of an emulsifying dispersant without stirring, or a whole amount of vinyl acetate to be polymerized is added to an aqueous solution of an emulsifying dispersant at one time or under a similar condition with stirring, in place of employing the aforesaid step of this invention, a stable vinyl acetate emulsified dispersion cannot be obtained. Also, when such an unstable vinyl acetate emulsified dispersion is used, it becomes difficult to control the viscosity and particle size of the emulsion obtained in the subsequent polymerization step and the composition of the copolymer, whereby the quality of the emulsions obtained as the product is not uniform. Furthermore, in an extreme case, the viscosity of the emulsion becomes too high to stir the emulsion during the polymerization.

A third step is a step of obtaining the vinyl acetate-ethylene copolymer emulsion of this invention by carrying out a polymerization reaction at a polymerization temperature of from 30° to 80° C. and an ethylene pressure of from 10 to 100 kg/cm$^2$ by using the vinyl acetate-ethylene emulsified dispersion obtained in the second step, while adding successively from 10 to 60% by weight of vinyl acetate which is the residue of vinyl acetate to be polymerized to the polymerization system during the polymerization and further adding thereto at least 0.004 mole of an oxidizing agent of a redox catalyst per kilogram of the whole of vinyl acetate supplied within 3 hours after the initiation of the polymerization.

In this invention, from 70 to 100% by weight of the emulsifying dispersant may be used in the first step and from 30 to 0% thereof (the residue) may be added to the polymerization system in the third step.

One of the features of this invention resides is the point of employing the separate addition system that from 40 to 90% by weight, and preferably from 50 to 80% by weight of vinyl acetate to be polymerized is added in the second step and from 60 to 10% by weight, and preferably from 50 to 20% by weight thereof (remaining vinyl acetate) is added in the third step.

When the amount of vinyl acetate added to the polymerization system in the third step is over the separation ratio defined in this invention, an adhesive using the copolymer emulsion obtained is inferior in resistance to thermal creep. On the other hand, when the amount is less than the separation ratio defined in this invention, the particle size of the emulsion becomes too large, the emulsion is inferior in initial adhesion properties, and the increased viscosity of the emulsion formed makes it difficult to undergo stirring during the production of the emulsion.

Moreover, it is important in the polymerization reaction that the polymerization reaction rate at the beginning of the polymerization be kept high. If the polymerization reaction rate is insufficient, the particle size of the emulsion becomes too large, and the initial adhesion properties of the emulsion become inferior. In this invention, for keeping the polymerization reaction rate high, a characteristic method of adding at least 0.004 mole of an oxidizing agent of a redox catalyst per kilogram of the whole of vinyl acetate supplied to the reaction system within 3 hours after the initiation of the polymerization reaction is employed. In addition, for keeping the reaction rate high at the beginning of the polymerization, it is useful to employ a lower temperature to initiate the polymerization reaction than in an ordinary case.

As the oxidizing agent of redox catalyst used in this invention, oxidizing agents which are usually used for the production of vinyl acetate-ethylene copolymer emulsions can be used, and specific examples thereof are hydrogen peroxide, t-butyl peroxide, sodium persulfate, potassium persulfate, and ammonium persulfate. The amount of the oxidizing agent totally used in the process is usually from 0.05 to 0.15 part by weight per 100 parts by weight of vinyl acetate to be polymerized.

In the case that the whole of the reducing agent to be totally used in the process is not added in the second step, the residue is added during the polymerization reaction in the third step.

The total amount of the reducing agent used in the second and third steps is in the range of from 0.5 to 1.5 moles per mole of the whole of the oxidizing agent.

In addition, a vinyl acetate-ethylene-third component copolymer may be used in place or together with the vinyl acetate-ethylene copolymer described above. The "third component" as referred to herein is a component having a functional group such as an amido group, a carboxylic acid group, a hydroxyl group, a sulfonic acid group, and an N-methylol group. Such a third component is contained in the range of not more than 10 parts by weight per 100 parts by weight of the vinyl acetate component.

The following examples are intended to illustrate this invention but not to limit it in any way.

The evaluation methods (conditions) of emulsions employed in the following Examples and Comparison Examples are as follows.

1. Physical Properties of Emulsion (1) Solids content: Residue (weight %) after drying for 3 hours at 105° C.

(2) Viscosity: BL-Type viscometer, 60 r.p.m., 25° C.

(3) Mean particle size: The particle size was determined from the absorbance (wavelength of from 350 m$\mu$ to 600 m$\mu$) of an emulsion diluted with water so as to have a solids content of 0.01% by weight.

Incidentally, a previously prepared particle size (by electron microscopic observation)-absorbance calibration curve was used.

(4) Scum: An emulsion was filtered by a wire gauze of 300 mesh, and the residue (weight %) on the wire gauze was defined as scum.

2. Resistance to Water Blushing of Film

An emulsion was coated on a slide glass sheet and dried (23° C., 65% RH) to form a film of 0.15 mm in thickness, the film was placed on Chinese characters of 8 point type of a news paper, one water drop was dropped on the film, and the time required until the characters became unreadable through the film by blushing of the film was measured. When the time is longer, the resistance to water blushing is higher.

3. Adhesion Performance (1) Initial adhesion properties: A corrugated board (basis weight 200 g/m$^2$) was coated with 3 ml (wet) of an emulsion, a wood free paper (basis weight 90 g/m$^2$) was superposed on the emulsion-coated layer, and after pressing them by rubber rollers, the time required until the paper caused 100% break at 23° C., 65% RH was measured. When the time is shorter, the initial adhesion properties are better.

(2) Cloth/cloth adhesion properties: A cotton broad cloth of #40 was coated with an emulsion (100 g/m$^2$), a cotton broad cloth of #40 was superposed thereon, and after pressing them at 0.01 kg/cm$^2$ for 18 hours, the assembly was cured for 6 days at 23° C., 65% RH. Thereafter, the following properties were measured.

(a) Dry strength: A strength of the assembly by T-form peeling in one inch width was measured.

(b) Wet strength: A strength of the assembly after being immersed in water for one hour was measured.

(c) Resistance to thermal creep: A load of 500 g was hung down from the assembly in one inch width, and the peeled length after allowing to stand at 80° C. for one hour was measured. When the length is shorter, the resistance to thermal creep is higher.

(d) Resistance to water retention: A value of (wet strength/dry strength)×100 was employed as the resistance to water retention. As the value is nearer 100, the resistance to water retention is higher.

(3) Cloth/plastic adhesion properties: A cloth (cotton broad cloth of #40) was coated with an emulsion (100 g/m$^2$), a plastic film (PET or OPP) was superposed thereon, and after pressing them by rubber rollers, the assembly was cured for 4 days at 23° C., 65% RH. Thereafter, the following properties were measured.

(a) Dry strength: A strength of the assembly by peeling at 180 degree in one inch width was measured.

(b) Wet strength and resistance to water retention: Same as the aforesaid measurement methods for the cloth/cloth adhesion properties.

(4) Polyvinyl chloride/plywood adhesion properties: A lauan plywood (JAS Class 1, the 1st grade, 3 mm thick) was coated with an emulsion (150 g/m$^2$), a polyvinyl chloride sheet (semi-rigid doubling sheet) was laminated thereon, and after pressing them for 20 days at 0.05 kg/cm$^2$, the assembly was cured for 6 days at 23° C., 65% RH. Thereafter, the following properties were measured.

(a) Dry strength: Same as the aforesaid measurement method for the cloth/plastic adhesion properties.

(b) Low-temperature adhesion properties: A test piece of the assembly was cut into a 1 cm width, was allowed to stand for 20 hours at −20° C., the polyvinyl chloride sheet was quickly peeled from the cloth by hands, and the degree of breakage of the wood was measured. As the value is larger, the low-temperature adhesion properties are better.

EXAMPLE 1

In a 300 liter pressure-resisting reaction vessel equipped with a stirrer were placed 49,200 ml of water, 260 ml of 50 wt % acetic acid (pH buffer solution), 1,340 of partially saponified polyvinyl alcohol having a polymerization degree of 350 and a saponification degree of 89%, 1,340 g of partially saponified polyvinyl alcohol having a polymerization degree of 550 and a saponification degree of 89% (average polymerization degree of two kinds of partially saponified polyvinyl alcohol: 450, ratio of the polyvinyl alcohols to the total amount of vinyl acetate: 1.8/100 by weight), and 2,235 g of polyoxyethylene nonylphenol ether having an HLB of 17.1 (ratio to the total amount of vinyl acetate: 1.5/100 by weight), followed by stirring for 60 minutes at 30° C. and 230 r.p.m. to provide a uniform aqueous solution. Then, 2 g of ferrous sulfate and 5,200 ml of a 7 wt % sodium formaldehyde sulfoxylate aqueous solution were added to the uniform aqueous solution as reducing agents of redox catalyst to provide an aqueous solution of an emulsifying dispersant.

Then, to the aqueous solution of emulsifying dispersant was added 104 kg in total of vinyl acetate (70% by weight of the total amount of vinyl acetate) at an addition rate of 112 kg/hour under stirring at 230 r.p.m. to provide a vinyl acetate emulsified dispersion. The dispersion obtained was so stable that neither phase separation nor precipitation occurred when the dispersion was allowed to stand overnight.

Then, while stirring the vinyl acetate emulsified dispersion at 230 r.p.m., the inside atmosphere of the reaction vessel was replaced with nitrogen and then with ethylene, the inside pressure of the reaction vessel was increased with ethylene while increasing the temperature, and when the temperature and pressure reached 60° C. and 45 kg/cm$^2$, respectively, a 0.30 wt % hydrogen peroxide aqueous solution (an oxidizing agent of redox catalyst) was added to the dispersion at a rate of 3.80 liters/hour for 6.5 hours, and at the same time, remaining 45 kg of vinyl acetate was added thereto at a rate of 7.5 kg/hour. Hydrogen peroxide was added in an amount of 0.008 mole per kilogram of the whole of vinyl acetate supplied till that time within 3 hours after the initiation of the polymerization reaction.

During the aforesaid addition operation, the system was kept at 60° C. and an ethylene pressure of 45 kg/cm$^2$.

When the proportion of unreacted vinyl acetate became 1% by weight or less of the whole of vinyl acetate supplied, the reaction was defined to be finished.

The emulsion obtained was evaluated by the methods described above, and the results are shown in Table 1 below along with those in other Examples and Comparison Examples.

EXAMPLE 2

The same procedures as in Example 1 were followed, except that 1,900 g (ratio to the total amount of vinyl acetate: 1.3/100 by weight) of only one partially saponified polyvinyl alcohol having a polymerization degree of 550 and a saponification degree of 89% was used as the partially saponified polyvinyl alcohol.

EXAMPLE 3

The same procedures as in Example 1 were followed, except that 2,235 g of polyoxyethylene nonylphenyl ether having an HLB of 17.1 and 745 g of polyoxyethylene nonylphenol ether having an HLB of 13.2 (ratio of both surface active agents to the total amount of vinyl acetate: 1.5/100 by weight) were used together as the polyoxyethylene surface active agent.

EXAMPLE 4

In a 300 liter pressure-resisting reaction vessel equipped with a stirrer were placed 49,200 ml of water, 260 ml of 50 wt % acetic acid (pH buffer solution), 1,940 g of partially saponified polyvinyl alcohol having a polymerization degree of 350 and a saponification degree of 89%, 600 g of partially saponified polyvinyl alcohol having a polymerization degree of 1,050 and a saponification degree of 89% (average polymerization degree of two kinds of partially saponified polyvinyl alcohol: 515, ratio of the polyvinyl alcohols to the total amount of vinyl acetate: 1.7/100 by weight), 2,235 g of polyoxyethylene nonylphenol ether having an HLB of 17.1 (ratio to the total amount of vinyl acetate: 1.5/100 by weight), and 745 g of polyoxyethylene nonylphenyl ether having an HLB of 13.2 (ratio to the total amount of vinyl acetate: 0.5/100 by weight), followed by stirring for 60 minutes at 30° C. and 230 r.p.m. to provide a uniform aqueous solution. Then, 2 g of ferrous sulfate and 5,200 ml of a 7 wt % sodium formaldehyde sulfoxylate aqueous solution were added thereto as reducing agents of redox catalyst to provide an aqueous solution of an emulsifying dispersant.

Then, to the aqueous solution of emulsifying dispersant was added 75 kg in total of vinyl acetate (50% by weight of the total amount of vinyl acetate) at an addition rate of 80 kg/hour under stirring at 230 r.p.m. to provide a vinyl acetate emulsified dispersion. The dispersion was so stable that neither phase separation nor precipitation occurred when the dispersion was allowed to stand overnight.

Then, while stirring the vinyl acetate emulsified dispersion at 230 r.p.m., the inside atmosphere of the reaction vessel was replaced with nitrogen and then with ethylene, the inside pressure of the reaction vessel was increased with ethylene while increasing the temperature, and when the temperature and pressure reached 60° C. and 45 kg/cm$^2$, respectively, a 0.30 wt % hydrogen peroxide aqueous solution (an oxidizing agent of redox catalyst) was added thereto at a rate of 4.55 liters/hour for 5.5 hours, and at the same time, remaining 74 kg of vinyl acetate was added thereto at a rate of 15 kg/hour. This means that hydrogen peroxide was added in an amount of 0.01 mole per kilogram of the whole of vinyl acetate supplied until that time within 3 hours after the initiation of the polymerization reaction.

During the aforesaid addition operation, the system was kept at 60° C. and an ethylene pressure of 45 g/cm$^2$.

When the proportion of unreacted vinyl acetate became 1% or less of the whole of vinyl acetate supplied, the reaction was defined to be finished.

The emulsion obtained was evaluated by the methods described above.

EXAMPLE 5

The same procedures as in Example 4 were followed, except that 1,490 g (ratio to the total amount of vinyl acetate: 1.0/100 by weight) of partially saponified polyvinyl alcohol having a polymerization degree of 350 and a saponification degree of 89% and 1,190 g (ratio to the total amount of vinyl acetate: 0.8/100 by weight) were used as the partially saponified polyvinyl alcohol.

COMPARISON EXAMPLE 1

The same procedures as in Example 1 were followed, except that 600 g of partially saponified polyvinyl alcohol having a polymerization degree of 350 and a saponification degree of 89% and 600 g of partially saponified polyvinyl alcohol having a polymerization degree of 550 and a saponification degree of 89% were used as the partially saponified polyvinyl alcohol.

In this comparison example, the amount of partially saponified polyvinyl alcohols (ratio to the total amount of vinyl acetate: 0.8/100 by weight) was less than the amount defined in this invention, and the emulsion was accompanied by the formation of scums of 50,000 ppm, which was outside the evaluation for practical use.

COMPARISON EXAMPLES 2 AND 3

The same procedures as in Example 1 were followed, except that 1,520 g of partially saponified polyvinyl alcohol having a polymerization degree of 350 and a saponification degree of 89% and 1,520 g of partially saponified polyvinyl alcohol having a polymerization degree of 550 and a saponification degree of 89% (Comparison Example 2) or 2,235 g of partially saponified polyvinyl alcohol having a polymerization degree of 350 and a saponification degree of 89% and 2,235 g of partially saponified polyvinyl alcohol having a polymerization degree of 550 and a saponification degree of 89% (Comparison Example 3) were used as the partially saponified polyvinyl alcohol.

In these comparison examples, the amount of the partially saponified polyvinyl alcohols (ratio to the total amount of vinyl acetate: 2.0/100 by weight in Comparison Example 2 and 3.0/100 by weight in Comparison Example 3, respectively) was larger than the amount defined in this invention, and the emulsions obtained were inferior, in particular, in resistance to water blushing, wet strength and resistance to water retention of film.

COMPARISON EXAMPLE 4

The same procedures as in Example 1 were followed, except that 1,680 g of partially saponified polyvinyl alcohol having a polymerization degree of 250 and a saponification degree of 89% was used as the partially saponified polyvinyl alcohol.

In this comparison example, the polymerization degree (250) of partially saponified polyvinyl alcohol was less than that defined in this invention, and the emulsion formed was accompanied by the formation of about 2,000 ppm of scums as well as a supernatant liquid was formed during allowing to stand the emulsion, which were outside the evaluation for practical use.

COMPARISON EXAMPLE 5

The same procedures as in Example 1 were followed, except that 1,680 g of partially saponified polyvinyl alcohol having a polymerization degree of 1,150 and a saponification degree of 89% was used as the partially saponified polyvinyl alcohol.

In this comparison example, the polymerization degree (1,150) of partially saponified polyvinyl alcohol was higher than that defined in this invention, whereby the viscosity of the emulsion was greatly increased during the polymerization, making the stirring operation difficult. Furthermore, the emulsion formed has a solids content of 66.7% by weight and a viscosity of 10,000 cps or more, which were outside the evaluation for practical use.

COMPARISON EXAMPLE 6

The same procedures as in Example 1 were followed, except that 2,235 g polyoxyethylene nonylphenyl ether having an HLB of 15.7 was used as the polyoxyethylene nonionic surface active agent.

In this comparison example, the HLB of the polyoxyethylene nonionic surface active agent used was lower than that defined in this invention. Thus, the mean particle size of the emulsion obtained became too large, a large amount of scums were formed, and in particular, the emulsion was inferior in initial adhesion properties.

COMPARISON EXAMPLE 7

The same procedures as in Example 1 were followed, except that 1,192 g polyoxyethylene nonylphenyl ether having an HLB of 17.1 was used as the polyoxyethylene nonionic surface active agent.

In this comparison example, the amount (ratio to the total amount of vinyl acetate: 0.8/100 by weight) of the polyoxyethylene nonionic surface active agent was lower than that defined in this invention; therefore, the emulsion obtained was accompanied by the formation of a large amount of scum was inferior in initial adhesion properties, low-temperature adhesion properties, and in polyvinyl chloride/plywood adhesion properties.

COMPARISON EXAMPLE 8

The same procedures as in Example 1 were followed, except that 5,215 g polyoxyethylene nonylphenyl ether having an HLB of 17.1 was used as the polyoxyethylene nonionic surface active agent.

In this comparison example, the amount (ratio to the total amount of vinyl acetate: 3.5/100 by weight) of the polyoxyethylene nonionic surface active agent was larger than that defined in this invention, and the emulsion obtained was accompanied by the formation of a large amount of scum and was inferior in, in particular: resistance to thermal creep, wet strength, and resistance to water retention.

COMPARISON EXAMPLE 9

The same procedures as in Example 1 were followed, except that the whole (149 g) of vinyl acetate used was added at one time to the aqueous solution of emulsifying dispersant.

The emulsion obtained without employing the separate addition system of vinyl acetate, which was a feature of this invention, had too a large mean particle size and unusually high viscosity and was inferior in initial adhesion properties.

COMPARISON EXAMPLE 10

The same procedures as in Example 1 were followed, except that 37 kg of vinyl acetate was added to the aqueous solution of emulsifying dispersant and that 112 kg of vinyl acetate was then added thereto at a rate of 79 kg/hour during the polymerization reaction.

In this comparison example, the amount of vinyl acetate initially added to the aqueous solution of emulsifying dispersant (25% of the total amount of vinyl acetate used) was less than that defined in this invention, and the emulsion obtained was accompanied by the formation of a large amount of scum and was inferior in resistance to thermal creep.

COMPARISON EXAMPLE 11

The same procedures as in Example 1 were followed, except that 104 kg of vinyl acetate was added to the aqueous solution of emulsifying dispersant over a period of 10 minutes. The vinyl acetate emulsified dispersion obtained was unstable so that phase separation occurred after 3 hours. When the polymerization reaction was carried out using such an unstable vinyl acetate emulsified dispersion, the viscosity of the reaction system was abnormally increased after 3 hours following the initiation of polymerization, so that it became impossible to further continue the polymerization reaction.

COMPARISON EXAMPLE 12

The same procedures as in Example 1 were followed, except that a 0.15 wt % hydrogen peroxide aqueous solution was added at a rate of 2.85 liters/hour for 8.5 hours.

In this comparison example, the amount of the oxidizing agent supplied within 3 hours following the initiation of the polymerization reaction was 0.003 mole per kilogram of the total amount of vinyl acetate supplied up to that time, which was less than that defined in this invention. The resulting emulsion had too large a mean particle size and high viscosity and was inferior in initial adhesion properties.

TABLE 1

|  | Example | | | | | Comparison Example | | | | | | | |
| --- | --- | --- | --- | --- | --- | --- | --- | --- | --- | --- | --- | --- | --- |
|  | 1 | 2 | 3 | 4 | 5 | 2 | 3 | 6 | 7 | 8 | 9 | 10 | 12 |
| Properties of Emulsion | | | | | | | | | | | | | |
| Solids Content (wt %) | 67.2 | 67.0 | 68.0 | 66.9 | 67.1 | 67.0 | 66.6 | 67.4 | 67.4 | 67.6 | 67.2 | 67.7 | 67.0 |
| Viscosity (cps) | 1300 | 2000 | 1500 | 2200 | 3900 | 1520 | 1760 | 1000 | 1300 | 1970 | 7700 | 800 | 3500 |
| Mean Particle size (μm) | 0.76 | 0.78 | 0.74 | 0.74 | 0.76 | 0.77 | 0.78 | 1.01 | 0.86 | 0.70 | 1.12 | 0.69 | 1.03 |
| Scums (ppm) | 87 | 90 | 40 | 34 | 70 | 55 | 70 | 128 | 580 | 1320 | 25 | 700 | 30 |
| Ethylene Content (wt %) | 19.0 | 19.1 | 19.6 | 18.9 | 19.2 | 19.0 | 18.2 | 18.9 | 18.8 | 18.4 | 18.3 | 18.8 | 19.2 |
| Resistance of Water Blushing of Film (min) | >120 | >120 | >120 | >120 | >120 | 60 | 15 | >120 | >120 | 80 | >120 | >120 | 105 |
| Adhesion Performance | | | | | | | | | | | | | |
| Initial Adhesion Properties (min.) Cloth/cloth | 10 | 10 | 8 | 8 | 10 | 10 | 10 | 32 | 16 | 10 | 40 | 8 | 38 |
| Adhesion Properites | | | | | | | | | | | | | |
| Resistance to Thermal Creep (mm/hr) | 18 | 15 | 20 | 20 | 20 | 20 | 20 | 18 | 18 | 140 | 20 | 130 | 20 |
| Dry Strength (kg/in) | 4.5 | 4.6 | 4.4 | 4.6 | 4.5 | 4.5 | 4.6 | 4.4 | 4.5 | 4.6 | 4.5 | 4.4 | 4.5 |
| Wet Strength (kg/in) | 2.4 | 2.5 | 2.3 | 7.4 | 2.4 | 1.4 | 1.2 | 2.2 | 2.3 | 1.8 | 2.3 | 2.2 | 2.3 |
| Resistance to Water Retention (%) | 53 | 54 | 52 | 52 | 53 | 31 | 26 | 50 | 51 | 39 | 51 | 50 | 51 |
| Adhesion Performance Cloth/Plastic Adhesion Properties Cloth/PET | | | | | | | | | | | | | |
| Dry Strength (kg/in) | 490 | 470 | 500 | 490 | 480 | 480 | 430 | 480 | 500 | 470 | 480 | 470 | 460 |
| Wet Strength (kg/in) | 390 | 380 | 410 | 400 | 380 | 240 | 200 | 360 | 400 | 240 | 380 | 380 | 370 |
| Resistance to Water Retention (%) | 80 | 81 | 82 | 82 | 79 | 50 | 47 | 75 | 80 | 51 | 79 | 81 | 80 |
| Cloth/OPP | | | | | | | | | | | | | |
| Dry Strength (kg/in) | 320 | 310 | 320 | 310 | 310 | 300 | 260 | 310 | 300 | 310 | 310 | 320 | 300 |
| Wet Strength (kg/in) | 200 | 190 | 200 | 200 | 190 | 160 | 130 | 190 | 180 | 170 | 190 | 200 | 180 |
| Resistance to Water Retention (%) | 63 | 61 | 63 | 65 | 61 | 53 | 50 | 61 | 60 | 55 | 61 | 63 | 60 |
| Adhesion Performance Polyvinyl Chloride/ Plywood Adhesion Properties | | | | | | | | | | | | | |
| Dry Strength (kg/in) | 4.5 | 4.5 | 4.5 | 4.5 | 4.5 | 4.4 | 4.5 | 4.5 | 4.3 | 4.5 | 4.4 | 4.5 | 4.5 |
| Low-Temperature Adhesion Properties | good | good | good | good | good | good | good | good | poor | good | good | good | good |

Note:
Reistance to Water Retention = (Dry Strength/Wet Strength) × 100 (%)

As described above, this invention is a vinyl acetate-ethylene copolymer emulsion capable of providing an adhesive which has excellent initial adhesion properties, resistance to thermal creep, low-temperature adhesion properties, dry strength and wet strength, resistance to water retention, resistance to water blushing can be suitably used for adhering various materials. The invention also provides a production process for the vinyl acetate-ethylene copolymer emulsion which is unaccompanied by the formation of scum and which produces industrially proper viscosity of the emulsion.

While the invention has been described in detail and with reference to specific embodiments thereof, it will be apparent to one skilled in the art that various changes and modifications can be made therein without departing from the spirit and scope thereof.

What is claimed is:

1. A process for producing a vinyl acetate-ethylene copolymer emulsion comprising: a vinyl acetate-ethylene copolymer composed of from 10 to 40% by weight of an ethylene unit and from 90 to 60% by weight of a vinyl acetate unit, said emulsion having a mean particle size of not larger than 0.9 μm and a solids content of from 65 to 75% by weight; an emulsifying dispersant in an amount of from 2.5 to 5.0 parts by weight per 100 parts by weight of the vinyl acetate unit, wherein the emulsifying dispersant contains from 1.0 to 1.9 parts by weight of partially saponified polyvinyl alcohol prepared so as to have an average polymerization degree of from 300 to 1,000; and, from 1.0 to 3.0 parts by weight of a polyoxyethylene nonionic surface active agent having an HLB of from 16.5 to 17.5 per 100 parts by weight of the vinyl acetate unit, said process comprising:

mixing with stirring from 1.0 to 1.9 parts by weight of partially saponified polyvinyl alcohol prepared so as to have an average polymerization degree of from 300 to 1,000 and from 1.0 to 3.0 parts by weight of a polyoxyethylene nonionic surface active agent having an HLB of from 16.5 to 17.5 per 100 parts by weight of the whole of vinyl acetate to be polymerized together with a reducing agent of a redox catalyst, water, and optionally, a pH buffer to provide an aqueous solution containing from 2.5 parts by weight or more but less than 5.0 parts by weight of the emulsifying dispersant per 100 parts by weight of the vinyl acetate;

adding from 40 to 90% by weight of vinyl acetate to be polymerized to the aqueous solution of the emulsifying dispersant under stirring to provide a stable vinyl acetate emulsified dispersion; and carrying out a polymerization reaction at a polymerization temperature of from 30° to 80° C. and an ethylene pressure of from 10 to 100 kg/cm$^2$ by using the vinyl acetate emulsified dispersion, while successively adding from 10 to 60% of vinyl acetate which is the residue of vinyl acetate to be polymerized to the polymerization system during the polymerization and further adding thereto at least 0.004 mole of an oxidizing agent of redox catalyst per kilogram of the whole of vinyl acetate supplied within 3 hours after the initiation of the polymerization.

2. The process as in claim 1, wherein the partially saponified polyvinyl alcohol prepared so as to have an average polymerization degree of from 300 to 1,000 is used in an amount of from 1.2 to 1.8 parts by weight per 100 parts by weight of the whole of vinyl acetate to be polymerized.

3. The process as in claim 1, wherein the partially saponified polyvinyl alcohol prepared so as to have an average polymerization degree of from 300 to 1,000 contains partially saponified polyvinyl alcohol having a polymerization degree of over 1,000 and/or partially saponified polyvinyl alcohol having a polymerization degree of less than 300 as the component.

* * * * *